March 28, 1933.  M. O. RUSKA  1,903,245
MANUFACTURE OF BLANKS AND SIMILAR ARTICLES WITH JUMPED HEADS
Filed April 29, 1930
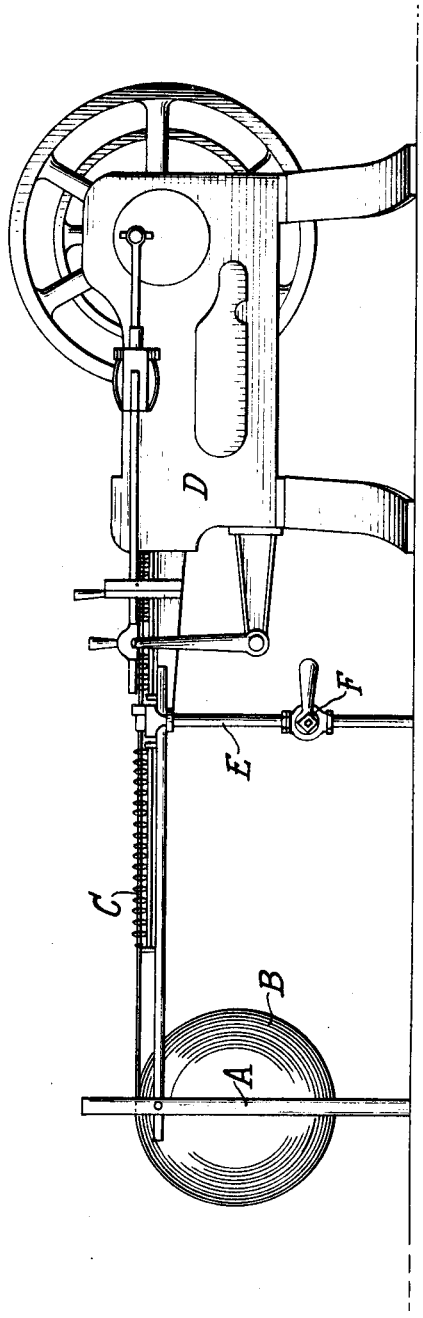
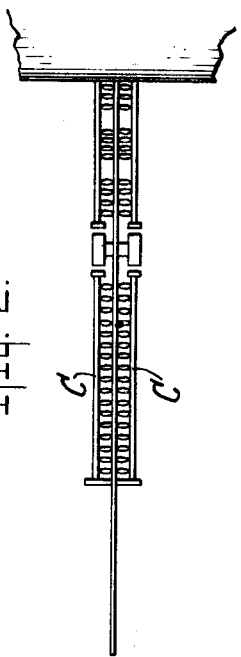
INVENTOR
Max Otto Ruska
BY
Richards & Geier
ATTORNEYS Patented Mar. 28, 1933

1,903,245

UNITED STATES PATENT OFFICE

MAX OTTO RUSKA, OF VOERDE, NEAR HAGEN, GERMANY

MANUFACTURE OF BLANKS AND SIMILAR ARTICLES WITH JUMPED HEADS

Application filed April 29, 1930, Serial No. 448,273, and in Germany May 1, 1929.

This invention relates to the manufacture of blanks and similar articles with jumped heads and more particularly to wood screws.

In the manufacture of wood screws and similar articles the usual process consists in forming blanks with jumped heads from wire of the same thickness as the shanks of the screws or other articles to be produced. The headed blanks are afterwards shaped in any suitable manner, for example by providing them with points and slotted heads. This process of manufacture is satisfactory if the wire can be worked in the cold state to jump or force out the heads, and wood screws can in this way be easily made from iron and brass. If, however, wood screws or similar articles are required made from what is known as "Delta metal", "Selva metal" or similar materials, the blanks are cut off from the wire, heated at one end in a coke fire, and then formed with heads under a friction press. This process, however, entails a considerable amount of waste due either to overheating and melting away of the ends of the blanks or to the subsequent breaking off of the heads owing to underheating. Attempts made with "Delta-metal" on machines to form blanks with jumped heads from continuously fed wire were unsuccessful when made on the ordinary machines with cold wire. It has hitherto been regarded as a definite fact and it was confirmed by the makers of the metal themselves that wood screws for example could not be made from such material as above mentioned. Nevertheless there is a demand therefor. It should be noted that "Delta metal" and "Selva metal" are equivalents, the former being manufactured by the firm Delta G. m. b. H. Dusseldorf, Germany, while the firm Basse & Selve, Altena, Germany, calls the same alloy "Selva metal". This alloy consists of about 52% copper, 45% zinc, 3% iron and also comprises small traces of aluminium, lead and nickel; it is somewhat similar to brass, but it is capable of resisting the action of sea-water and acid and is somewhat cheaper than ordinary brass. The use of "Delta metal" consequently affords cheaper products with a wider field of use and the chief object of the present invention is to enable screws and similar articles to be made from metals of the above mentioned kind. Besides this, and that also is a very important point, wood screws made from this continuously heated material have a strength of about 65 kilogrammes per square millimeter and an extension of about 30–36%, the corresponding figures of brass wood screws being about 40 kilograms and 20–25%. These qualities give the screws the strength of steel and the possibility of use for unlimited periods without corrosion.

According to the invention the metal is heated prior to the formation of the blanks. For this purpose the metal preferably in wire form is fed continuously into a machine for forming the heads, there being arranged at or near the feed end of the machine a heating device for heating the metal. The heating device may comprise a series of gas burners or may be in the form of an electrical heater. By this way of continuous heating, one workman can easily attend to 4–5 presses with a daily (8 hours') output of about 200,000–250,000 blanks, whereas the former method on friction presses (2 men to attend to one press only) only allowed one hundredth of this quantity. It is a most important point that this invention enables the manufacture of screws of metals such as "Delta metal" at the same cost-price as for wood screws made of iron and brass.

In order that the said invention may be clearly understood and readily carried into effect, the same will now be described with reference to the accompanying drawing, wherein:

Fig. 1 is a side elevation of a wood screw forming machine having a gas heating device for heating the metal, and Fig. 2 is a plan view of part of Figure 1.

The heating device is inserted between the frame A which carries a reel of wire B and as close as possible to the forming tools of the machine D, and consists of a plurality of pipes C attached to a gas supply pipe E and the walls of which are provided with fine perforations. The gas issuing from the fine perforations is ignited and heats the wire. The temperature is determined by means of tests. In the case of thin wire it amounts to about 250° C. and rises according to the thickness of the wire up to about 350° C. A cock F on the gas supply pipe E enables the amount of gas to be regulated and the temperature to be adjusted. By means of this arrangement "Delta metal" and other metals having similar characteristics thereto can be operated upon as successfully as ordinary brass or iron.

I claim:

In a process of making screw blanks and similar articles, the steps of continuously heating a portion of a wire made of a non-rusting acid-proof and seawater-proof metal alloy which is unworkable in a cold state of the type comprising Delta metal and Selva metal to a temperature ranging between 250° C. and 350° C., operating on the end of the heated portion in a one blow press and then cutting off a piece of the heated portion, the cut off piece being cooled after the last-mentioned step.

In testimony whereof I have affixed my signature.

MAX OTTO RUSKA.